UNITED STATES PATENT OFFICE.

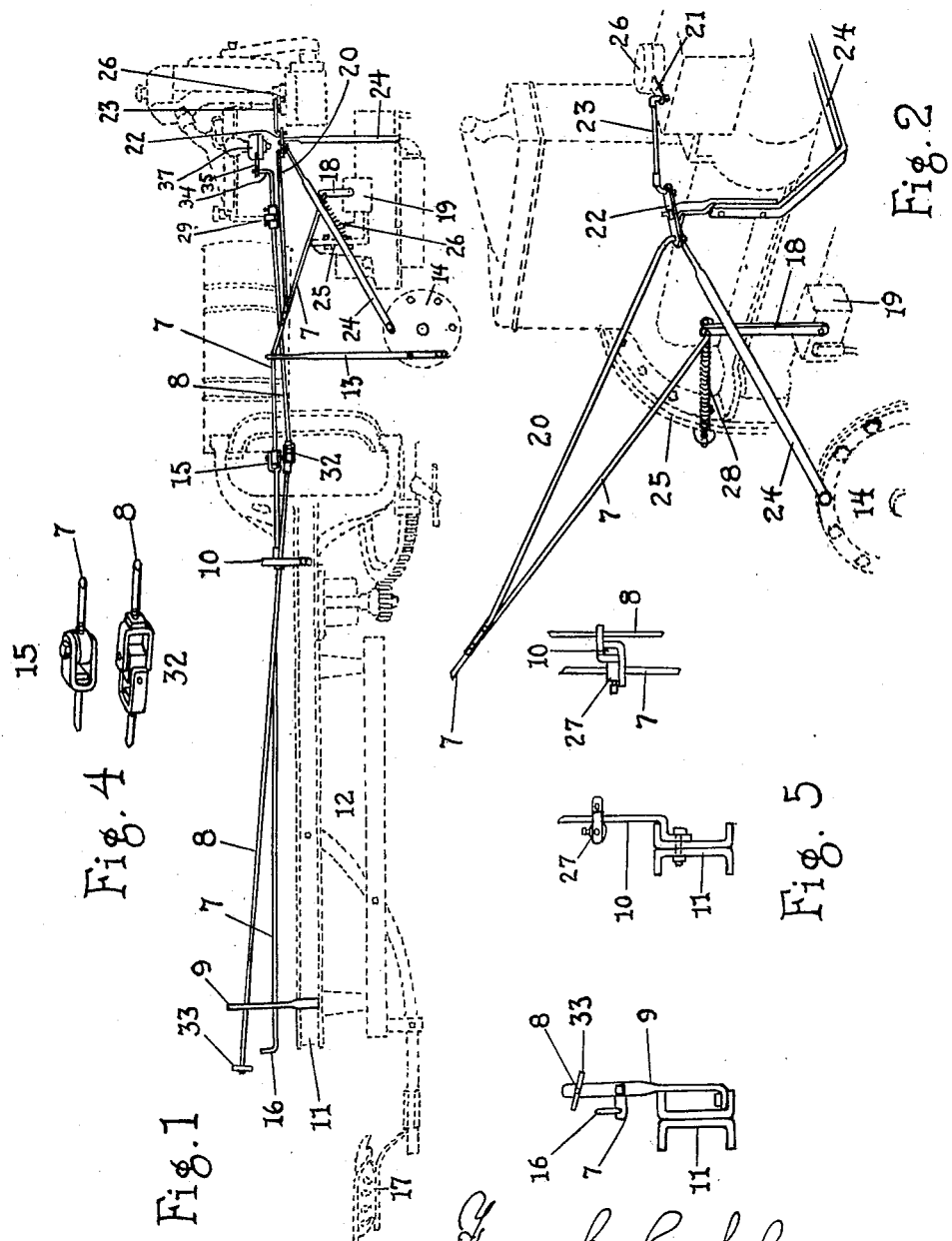

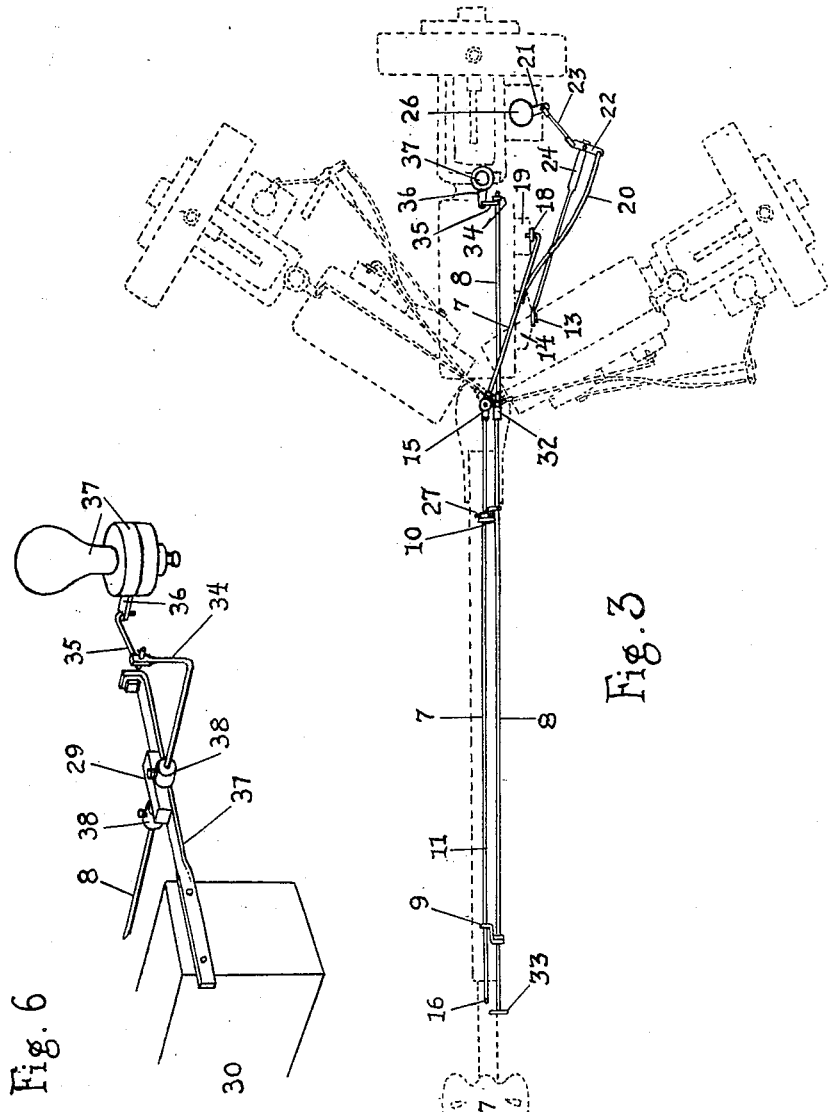

FRANK GOEBEL, OF PETERSBURG, NEBRASKA.

ATTACHMENT FOR SELF-STARTING TRACTORS.

1,408,286.　　　　Specification of Letters Patent.　Patented Feb. 28, 1922.

Application filed February 7, 1921. Serial No. 443,237.

*To all whom it may concern:*

Be it known that I, FRANK GOEBEL, a citizen of the United States, residing in the village of Petersburg, in the county of Boone and State of Nebraska, have invented certain new and useful Improvements in Attachments for Self-Starting Tractors, and have described the same in the following specification, illustrated by the accompanying drawings.

My improvements relate to attachments for two-wheel tractors of the type of the so-called Moline-universal tractor, which comprises an internal combustion engine and a self-starter, and is operatively combined and pivotally coupled with a plow, harrow or other trailing agricultural implement, ridden by the operator. It is the main object of the invention to enable the driver, while in gear, without leaving his seat on the trailer, to start the engine of such a tractor, and control the ignition and the action of the carbureter as the movement of the tractor begins. To accomplish these results, I incorporate in my improved attachment, as parts thereof, suitably mounted upon the combined tractor and trailer, and within reach of the driver, a pushrod having a hinge joint and connected with the starter lever as well as with the spark lever of the engine, and also a rockshaft having a universal joint and connected with the choke valve of the carbureter.

In said drawings, illustrating the best manner in which I have contemplated applying the principles of the invention, Fig. 1 is a side view of an attachment for self-moving tractors which is constructed in accordance with these principles and is shown as applied to a tractor of the specified type and to the agricultural implement which is coupled with this tractor. In this view the tractor and trailer are incompletely shown by dash lines. Fig. 2 is a similar perspective view of parts of the same attachment and of the same tractor to which it is applied. Fig. 3 is a plan view of the same attachment applied to the same tractor and trailer, exhibited in alternative working positions. Figures 4 and 5 are groups of details. Fig. 6 is a detail showing in perspective the carbureter and a portion of the connected rockshaft.

In these drawings the pushrod is denoted by the numeral 7, and the rockshaft by the numeral 8. The pushrod is supported and slidable endwise in the spaced brackets 9 and 10, which are secured to the framework 11 of the trailer 12, and in the bracket 13, which is secured to the axle-housing 14 of the tractor. Between the two last-mentioned brackets it has a hinge joint 15, which is substantially co-axial with the pivotal connection between the tractor and the trailer. It has at its rear end a finger 16, within reach of the driver from his seat 17 on the trailer, and has at the forward end a pivotal connection with the lever arm 18 of the self-starter 19 of the tractor engine. Forward of the bracket 13, it has a divergent branch 20, which is connected with the spark controlling lever 21 of the timer 26 by the consecutive links 22 and 23, one of which, the link 22, is pivotally mounted and oscillatable as a lever on the bracket 24 extending from the crank case 25 to the axle-housing 14. It is provided with an adjustable stop collar 27, adjacent to the bracket 10, and with a connected spiral spring 28, which is adapted to return the pushrod to its normal position as often as the latter is released after being pushed forward slidingly in said brackets by its terminal finger 16.

The lever arm 18 of the self-starter is wide-swinging, being movable pivotally by the pushrod in a well known manner, not only from a neutral to an operative or starting position and the reverse, but also from one neutral position to another.

The rockshaft 8 is journaled in the same brackets 9 and 10 and in the bearing-block 29 which is mounted on the battery box 30 by the bracket 31. It has between its forward and rearward portions a universal joint 32, which is positioned substantially in line with the vertical axis of the said pivotal connection between the tractor and the trailer. It has a terminal cross-handle 33 within reach of the driver from his seat 17, and at its forward end a rockarm 34, connected by the link 35 with the lever arm 36 which operates the choke valve of the carbureter 37. It is provided with the adjustable stop collars 38 to prevent it from slipping endwise in its bearings.

In the operation of the device, the engine being ready for action and operatively connected with the driving wheels of the tractor and the choke valve being at rest in its normal position, the operator seated on the trailer, pushes the pushrod forward, against the resistance of springs 28, until the stop collar 27 strikes the bracket 10. Thereby he moves the lever arms in unison, namely, the arm 18, which first moves a short distance ineffectually from one neutral position to another and afterwards brings the self-starter into action, and the lever 21 which immediately retards the spark. At the same time he turns the rockshaft rotarily through a small angle and thereby operates the choke valve to cause a suitable enrichment of the fuel mixture. Then as the machine moves forward he lets go the pushrod 7, which is immediately retracted by the spring 28, with the result that the wide-swinging self-starter lever is returned to its original neutral position, while the spark is advanced to its normal position for ordinary running. These steps he times or continues and co-ordinates until the combined tractor and trailer moves normally. If then, for any reason, such as a difficult grade or harder soil and reduced speed, he wishes to set back the spark from its normal position, he pushes the pushrod forward a slight distance, sufficient to retard the spark to a moderate degree, but insufficient, by reason of lost motion, to bring the self-starter into action. The described joints of the pushrod and the rockshaft permit this operation of the attachment to occur when the tractor is turning aside from its straight course, or stands at an angle therewith, as in Fig. 3.

I claim as my invention—

1. An attachment for a self-starting tractor of the specified type and for a trailing agricultural implement pivotally coupled with the tractor, comprising a pushrod, having two branches and mounted within reach of a driver from his seat on the trailer, a positive connection between one of the branches and the spark timer of the tractor engine, and an operative connection allowing lost motion between the other of the branches and the self-starter.

2. An attachment for a self-starting tractor of the specified type and for a trailer pivotally coupled with the tractor, comprising a control rod mounted within reach of the driver and operatively connected with the choke valve of the carbureter of the tractor engine, a pushrod similarly mounted, a positive connection between the pushrod and the spark timer of the engine, and an operative connection, allowing lost motion, between the pushrod and the self-starter.

Witness my signature at Petersburg, Nebraska, this 2d day of February, 1921.

FRANK GOEBEL.